Aug. 24, 1965  F. P. WILLIAMS  3,202,285
SEWAGE TREATMENT STRUCTURES
Filed Aug. 8, 1961  4 Sheets-Sheet 1
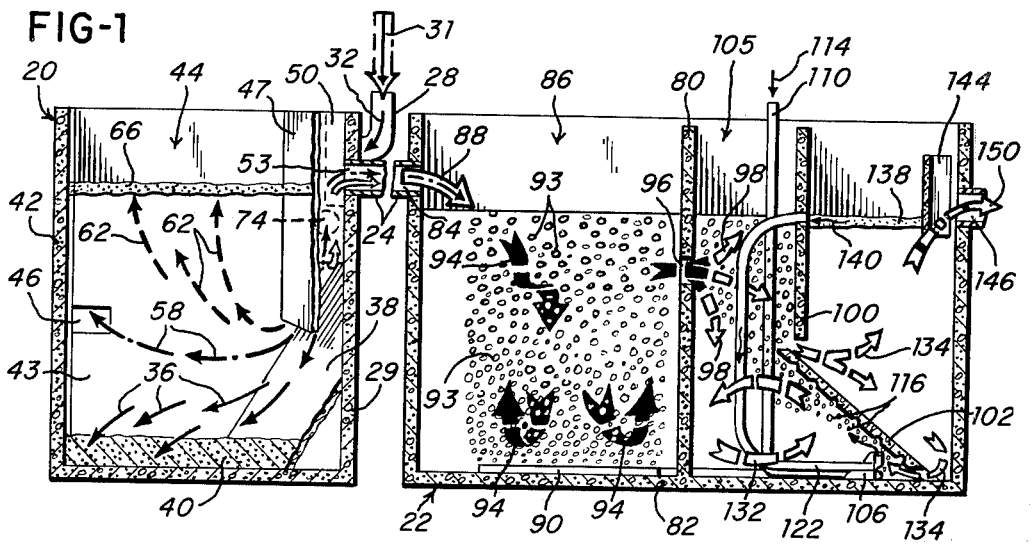
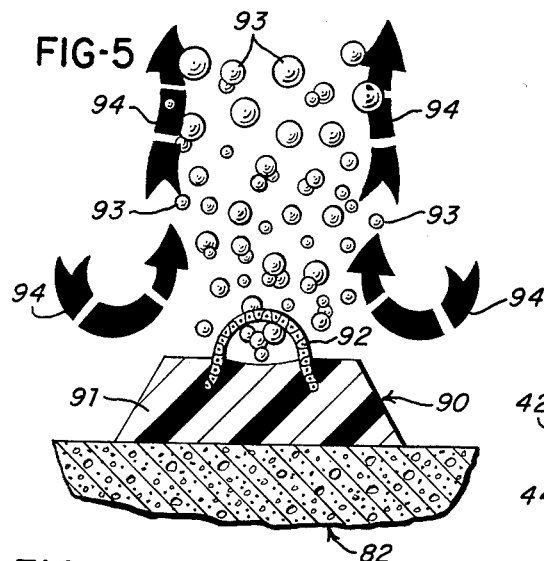
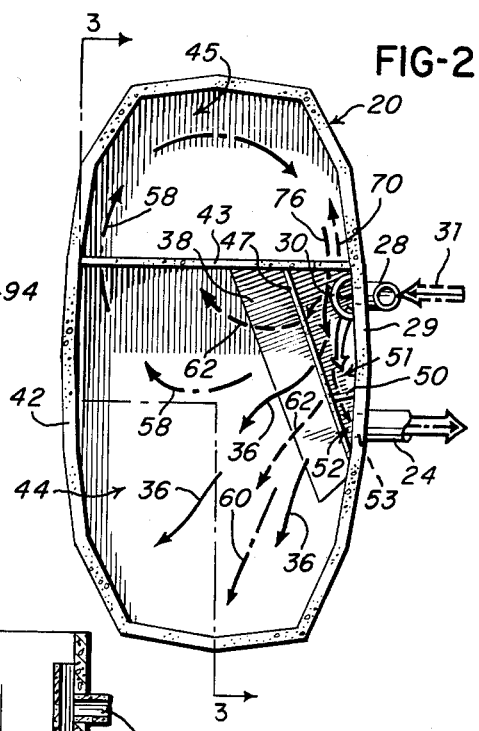
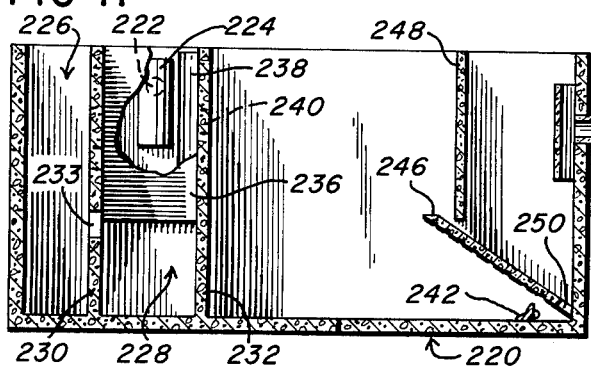
*INVENTOR.*
FREDERICK P. WILLIAMS
BY *William R. Jacox*
ATTORNEY

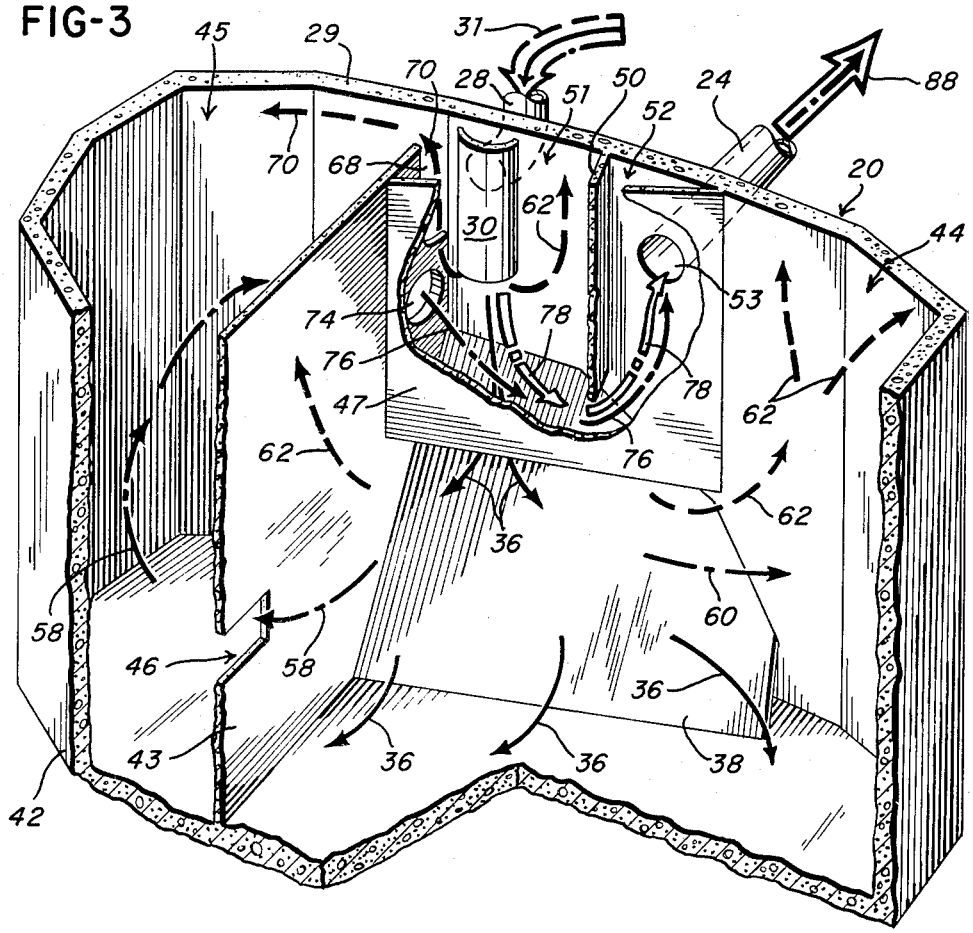
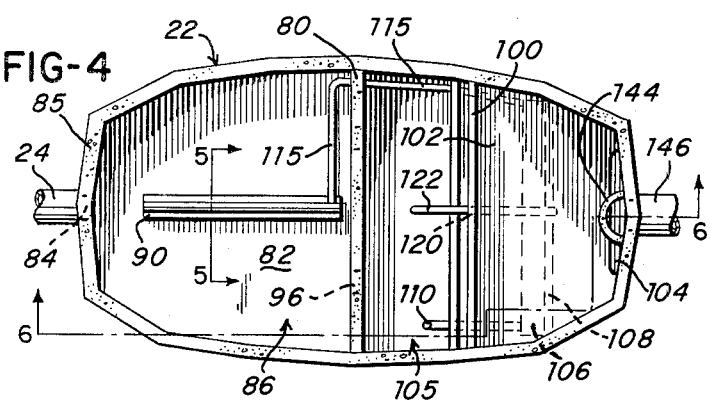

Aug. 24, 1965  F. P. WILLIAMS  3,202,285
SEWAGE TREATMENT STRUCTURES
Filed Aug. 8, 1961  4 Sheets-Sheet 3

INVENTOR.
FREDERICK P. WILLIAMS
BY William R Jacox
ATTORNEY

Aug. 24, 1965
F. P. WILLIAMS
3,202,285
SEWAGE TREATMENT STRUCTURES
Filed Aug. 8, 1961
4 Sheets-Sheet 4
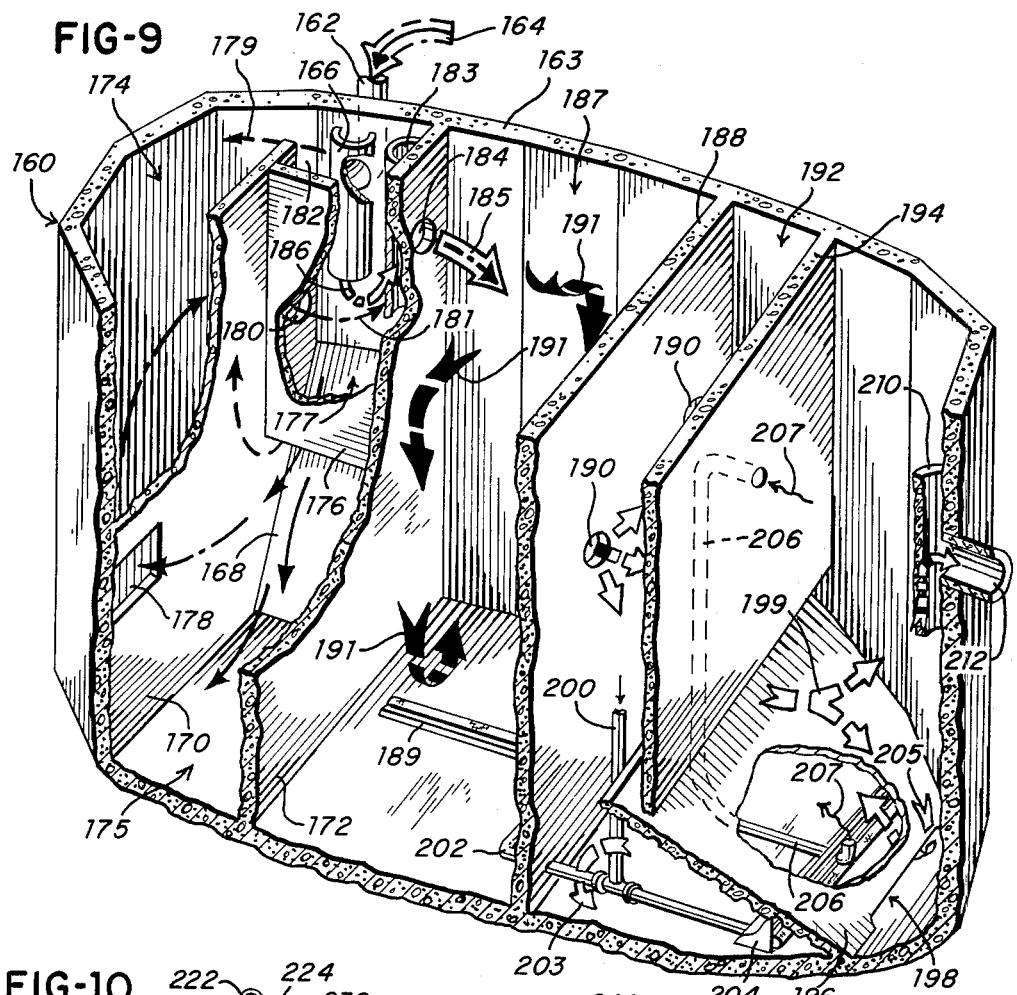
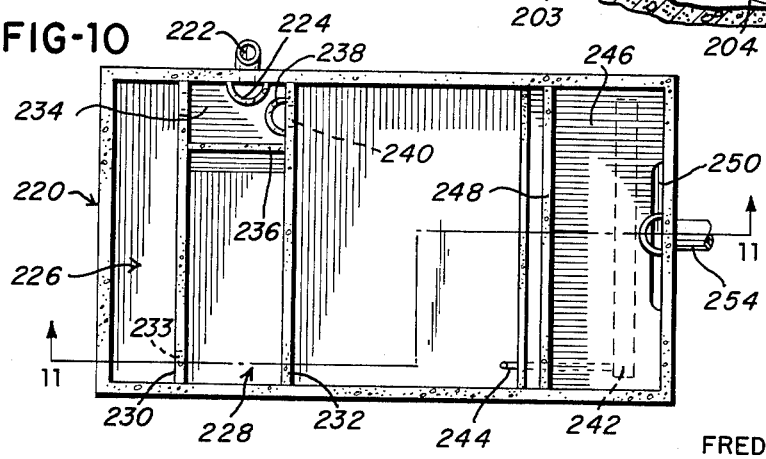
INVENTOR.
FREDERICK P. WILLIAMS
BY *William R. Jacox*
ATTORNEY

United States Patent Office 3,202,285
Patented Aug. 24, 1965

3,202,285
SEWAGE TREATMENT STRUCTURES
Frederick P. Williams, Montgomery County, Ohio
(713 N. Euclid Ave., Dayton 7, Ohio)
Filed Aug. 8, 1961, Ser. No. 130,109
9 Claims. (Cl. 210—195)

This invention relates to sewage treatment structures.

In the art of sewage treatment, conditions may be created which are favorable to action upon the sewage by anaerobic bacteria. Also, conditions may be created which are favorable to action upon the sewage by aerobic bacteria. Ordinarily, when conditions are favorable to one of these types of bacteria, the presence of the other type of bacteria is negligible. In some sewage treatment systems favorable conditions are provided for action by anaerobic bacteria. In other sewage systems favorable conditions are provided for action by aerobic bacteria. In other sewage systems, there are conditions provided which are favorable to anaerobic bacteria action and conditions are also provided which are favorable to aerobic bacteria action.

A septic tank or chamber may be used in which anaerobic bacteria action decomposes sludge and scum and soluble materials. It has been found desirable in many installations to also employ aerobic bacteria action in another chamber or tank. It is generally considered that aerobic bacteria action provides a greater degree of purification of sewage or aerobic bacteria action causes the effluent to be in a more favorable condition to enter streams, rivers, etc., than is possible when only anaerobic bacteria action is used. Most installations which obtain action by aerobic bacteria include means for aeration of the sewage.

It has also been found that it may be desirable to prevent sewage which is to be treated by aerobic bacteria action from first becoming septic. "Septic" means that the sewage is acted upon by anaerobic bacteria.

It is an object of this invention to provide sewage treatment structure in which sewage is treated by anaerobic bacteria action and also by aerobic bacteria action, but in which much of the sewage which is treated by aerobic bacteria action is not treated to any appreciable extent by anaerobic bacteria action.

Another object of this invention is the provision of structure in which much of the material which is treated by anaerobic bacteria is treated in more than one compartment or chamber.

It is another object of this invention to provide sewage treatment structure by which the sewage may be treated by both anaerobic bacteria and by aerobic bacteria in one tank or in a plurality of compartments or tanks.

Another object of this invention is to provide such sewage treatment structure in which no screens or the like are required.

Another object of this invention is to provide such sewage treatment structure in which there are no moving parts or elements in any chamber.

Another object of this invention is to provide sewage treatment structure in which a greater degree of purification by aeration action and aerobic bacteria action is produced.

Another object of this invention is to provide sewage treatment structure in which more effective treatment occurs upon scum and sludge by anaerobic bacteria action.

Another object of this invention is to provide novel gas diffuser structure for sewage treatment.

Another object of this invention is to provide positive scum and sludge circulation without the necessity of moving parts or elements.

Another object of this invention is to provide structure in which greater bacteria growth is possible.

Another object of this invention is to provide container structure which permits a single inclined coplanar baffle therein to form a hopper-type bottom having a restricted receiving area.

Another object of this invention is to provide structure having means for limiting the size and/or weight of particles allowed to enter a settling area.

Another object of this invention is to provide sewage treatment structure in which air or gases which are moving pass over a restricted area of a septic tank or chamber, thus retaining a maximum amount of noxious gases in the septic tank or chamber.

Another object of this invention is to provide structure in which air or gas requirements for aerobic bacteria treatment of sewage are less than in other systems for a given quantity and quality of sewage entering the structure.

Another object of this invention is to provide sewage treatment structure in which the time during which sewage is retained in the anaerobic portions of the structure is increased so that more complete anaerobic bacteria action is possible.

Another object of this invention is to provide sewage treatment structure in which a chamber structure is provided which causes a mixing action of material which has been treated by anaerobic bacteria with selected portions of incoming sewage without the use of mechanical equipment such as pumps or the like.

Other objects and advantages reside in the construction of parts, the combination thereof, the method of manufacture, and the mode of operation, as will become more apparent from the following description.

In the drawings:

FIGURE 1 is a side sectional view of sewage treatment structure of this invention.

FIGURE 2 is a top plan view of a portion of the structure shown in FIGURE 1.

FIGURE 3 is a sectional perspective view, with parts broken away, taken substantially on line 3—3 of FIGURE 2, but drawn on a larger scale than FIGURE 2.

FIGURE 4 is a top plan view of another portion of the structure shown in FIGURE 1.

FIGURE 5 is an enlarged sectional view taken substantially on line 5—5 of FIGURE 4.

FIGURE 9 is a perspective view, with parts broken away and shown in section, of a modification of the sewage treatment structure of this invention.

FIGURE 10 is a top plan view showing another modification of the sewage treatment structure of this invention.

FIGURE 11 is a sectional view, with parts broken away, taken substantially on line 11—11 of FIGURE 10.

Figure 6:
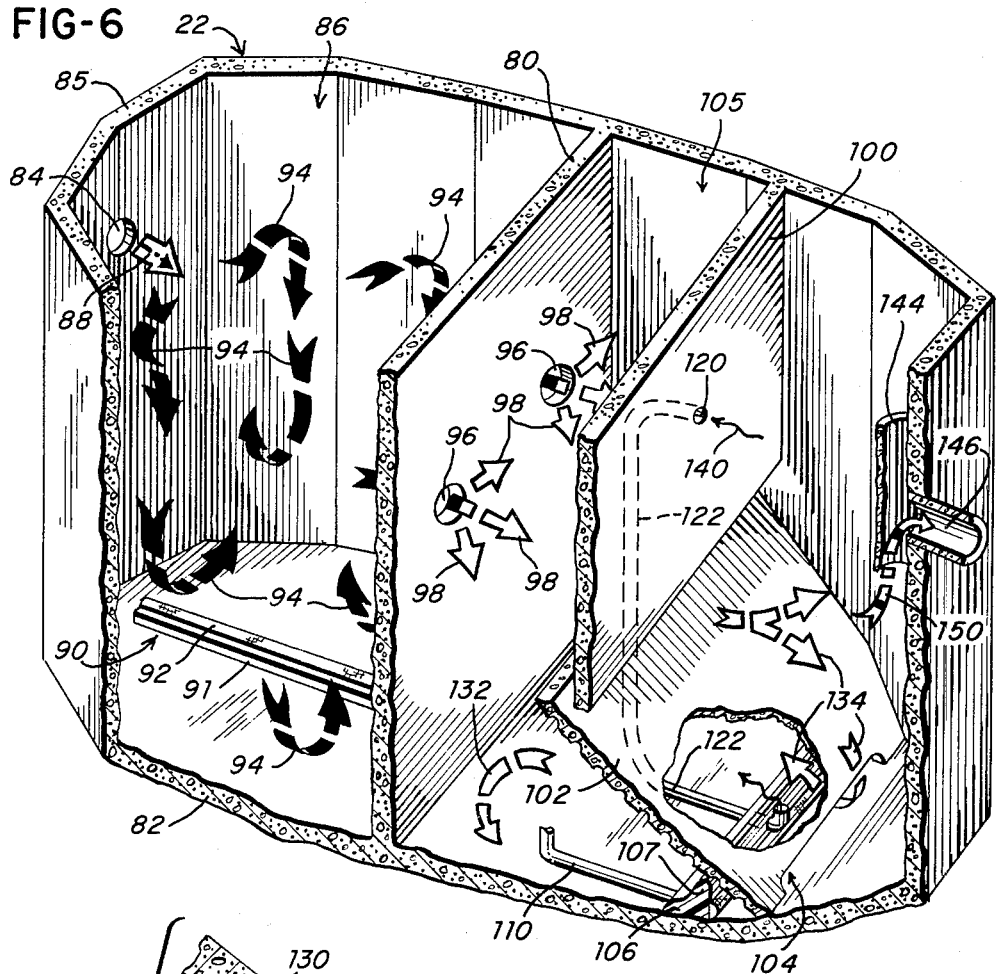
FIGURE 6 is an enlarged sectional view, with parts broken away, taken substantially on line 6—6 of FIGURE 4, but drawn on a larger scale than FIGURE 4.

Referring to the drawings in detail, sewage treatment structure of this invention as shown in FIGURE 1 comprises a septic tank 20, i.e., a tank in which there is predominately anaerobic bacteria action upon sewage. A second tank 22 is joined to the tank 20 by a conduit 24. The second tank 22 is basically an aeration tank for action therein by aerobic bacteria. The tanks 20 and 22 are covered in any suitable manner, not shown, and are ordinarily disposed within the ground below the surface thereof.

SEPTIC TANK 20

The septic tank 20 is shown in FIGURES 1, 2, and 3 and may be of any suitable size and shape, but is shown herein as having side portions in the form of a polygon. An inlet pipe or conduit 28 is shown entering the tank 20 at a side portion 29 thereof and at the upper portion thereof. The inlet pipe 28 has an opening into the tank 20. The opening is encompassed by an elongate upwardly extending arcuate baffle 30, as best shown in FIGURES 2 and 3, which causes all of the material which enters the tank 20 through the pipe 28 to be directed downwardly. The material entering the tank 20 through the pipe 28 is illustrated by arrows 31 and 32.

The greatest portion of the material entering the tank 20 through the pipe 28 is a liquid or water. However, there are also solids and semi-solid materials which enter the tank 20 which are either heavier or lighter than water. The heavier materials move downwardly as they enter the tank 20. This downward movement of the heavier materials is illustrated by arrows 36. An inclined deflector 38 is disposed within the tank 20 below the baffle 30 so that the heavier materials are deflected away from the side portion 29. Thus, the heavier materials cannot become disposed directly below the baffle 30. The heavier materials form a sludge 40 upon the bottom of the tank 20 in a manner similar to that shown in FIGURE 1.

Attached to the side portion 29 of the tank 20 and extending to an opposite side portion 42 thereof, is a partition 43. The partition 43 also is in contact with the bottom of the tank 20 and divides the tank 20 into compartments 44 and 45. The partition 43 has an opening 46 therethrough, adjacent the side portion 42.

Extending between the partition 43 and the side portion 29 in the compartment 44 of the tank 20 is a substantially vertically disposed baffle or partition 47. The baffle 47 has an upper edge adjacent the upper portion of the tank 20 but the baffle 47 has a lower edge spaced from the deflector 38 so that material moving downwardly from the baffle 30 passes between the baffle 47 and the deflector 38, as shown in FIGURES 1 and 3.

Attached to the baffle 47 and to the side portion 29 and extending therebetween is a substantially vertical separator baffle 50. The separator baffle 50 has an upper edge adjacent the upper portion of the tank 20 but the separator baffle 50 extends downwardly less than the baffle 47 so that the lower edge of the separator baffle 50 is higher than the lower edge of the baffle 47. The separator baffle 50 and the baffle 47, with the side portion 29 and with a part of the partition 43, form an inlet sub-compartment 51 and an outlet sub-compartment 52.

The side portion 29 of the tank 20 has an outlet opening 53 therethrough which is in communication with the outlet sub-compartment 52 and with the conduit 24.

Some of the material entering the tank 20 is slightly lighter than the material which deposits as sludge 40. This material may be referred to as medium weight material. Some of this medium weight material moves downwardly between the baffle 47 and the deflector 38. This medium weight material is such a weight or density that it passes through the opening 46 in the partition 43 and into the compartment 45 as shown by arrows 58 in FIGURES 1, 2, and 3. Some of the medium weight material also becomes disposed in the compartment 45 above the sludge 40, as shown by arrows 60 in FIGURES 2 and 3.

Also, a part of the material entering the tank 20 through the pipe 28 is material which is lighter than the medium weight material. The lightest material moves toward the top of the tank 20, as illustrated by arrows 62 in FIGURES 1, 2, and 3 and deposits at the top portion of the liquid in the tank 20 as scum 66, as shown in FIGURE 1. The lightest material entering the tank 20 may also pass through an opening 68 in the partition 43 adjacent the side portion 29 and becomes disposed at the upper portion of the material in the compartment 45, as illustrated by arrows 70 in FIGURE 3.

The bacteria within the tank 20, primarily anaerobic bacteria, act upon the material therein. Action upon the sludge 40 at the bottom of the compartment 44 changes the composition of the material and causes the material to become lighter so that some of the material from the bottom of the compartment 44 rises to the level in which it can flow through the opening 46 in the partition 43 and into the compartment 45. The opening 46 is disposed so that the purest material within the compartment 44, i.e., the material having a density closest to the density of water, flows through the opening 46. Flow or movement of the material at a given level within the tank 20 and flow of material from the tank 20 is primarily the result of the entrance of additional material into the tank 20 through the pipe 28. Decomposition by anaerobic bacteria action also occurs within the scum 66. Such decomposition of the scum 66 causes some of such material so acted upon to become heavier so that it moves to a lower level within the material contained by the tank 20. Such material may thus become part of the medium weight material intermediate the upper and lower portions of the tank 20. As stated above, such medium weight material within the compartment 44 is at a level which permits flow thereof through the opening 46 of the partition 43 from the compartment 44 into the compartment 45.

Material within the compartment 45 is also acted upon by bacteria therewithin. Thus, as in the compartment 44, the medium weight material is in the purest state of any of the material therewithin. The partition 43 is provided with an opening 74 therethrough adjacent the side portion 29 of the tank 20, as best shown in FIGURE 3. As additional material flows through the opening 46 of the partition 43 and into the compartment 45, material must flow out of the compartment 45. Thus, the material at a level equal to that of the opening 74 flows out of the compartment 45 through the opening 74 and into the sub-compartment 51, as illustrated by arrows 76 in FIGURES 2 and 3.

The flow of some of the material entering the tank 20 through the pipe 28 is illustrated by arrows 78 and is of such a degree of purification and thus has such a weight or density that such material mixes with and moves with the material illustrated by arrows 76 entering the inlet sub-compartment 51 through the opening 74. Thus, the material illustrated by arrows 76 and 78 moves under the separator baffle 50 and into the outlet sub-compartment 52 and out of the tank 20 through the outlet 53.

The separator baffle 50 prevents scum or other of the lightest material from flowing into the outlet sub-compartment 52 from the inlet sub-compartment 51. The deflector 38, as discussed above, causes the heavier materials to assume positions shown by the sludge 40 in FIGURE 1. Thus, the deflector 38 prevents the sludge 40 from forming below the sub-compartments 51 and 52. Thus, as decomposition of the sludge 40 occurs and materials rise therefrom, the rising materials accumulate away from the sub-compartments 51 and 52 and scum does not form in the sub-compartments 51 and 52. Thus, nearly all of the material which flows from the tank 20 is material illustrated by arrows 76 and by arrows 78. As discussed above, the material illustrated by arrows 76 has been treated within the tank 20 and material illustrated by arrows 78 is material of sufficient purity or of proper density as it enters the tank 20 that it flows with the treated material 76.

Thus, it is understood that material moving into the tank 20 is separated into several portions. Some of the material flows almost directly out of the tank 20 because as such material enters the tank 20 it is of a quality substantially equal to that of the purest material obtainable by treatment in the tank 20. Material which is considerably heavier or considerably lighter than water is treated by the bacteria within the tank 20 until it obtains a degree of purification and density which permits movement from the tank 20. Much of the material which requires treatment thereupon, such as the sludge and scum and materials having various degrees of sludge or scum remain in the tank 20 or pass through one or more of the compartments of the tank 20. Due to the fact that some of the material entering the tank 20 flows almost directly therefrom, only a portion of the material flowing from the tank 20 is treated material. Therefore, material which is treated in the tank 20 requires a greater period of time to move therethrough and thus receives greater treatment than would otherwise occur if all material flowing from the tank would be treated material. Therefore, some of the sewage which enters the tank 20 is permitted to move therefrom without the aerobic bacteria therein being subjected to the anaerobic conditions existing within the tank 20. Thus, this aerobic bacteria is not subjected to the unfavorable anaerobic environment in the septic tank.

Any suitable or desired method or structure may be used to treat the material which flows from the tank 20. In FIGURES 1, 4, and 6, the tank 22 is shown, into which the material or effluent from the tank 20 flows.

TANK 22

The tank 22 may be of any suitable or desired shape but is herein shown as being a polygon. The tank 22 has a partition 80 intermediate the ends thereof. The partition 80 engages a bottom wall 82 and opposed side walls of the tank 22. The tank 22 has an inlet opening 84 in an end wall 85 thereof so that material entering the tank 22 moves into a compartment 86 which is formed between the end wall 85 and the partition 80. Movement of material into the compartment 86 is illustrated by an arrow 88 in FIGURES 1 and 6.

Resting upon the bottom wall 82 and disposed within the compartment 86 is an air or gas diffuser 90, which is best shown in FIGURES 5 and 6. The diffuser 90 comprises an elongate base 91 which supports an elongate screen or perforated tube 92 into which air or other gas is forced at one end of the base 91. Preferably, the screen or tube 92 is of a material such as plastic or the like which is molded integral with the base 91. Furthermore, preferably, the material of the screen or tube 92 collapses when internal pressure of the air is removed therefrom so that in the collapsed condition the apertures in the screen 92 are closed. Thus, when there is no air or other gas emanating from the tube 92 objectionable flow of sewage material into the tube 92 is prevented. The air emanating from the tube 92 causes bubbles 93; the bubbles 93 move upwardly within the material located within the compartment 86, as illustrated in FIGURES 1 and 5. The bubbles 93 moving upwardly cause agitation of the material within the compartment 86, as illustrated by arrows 94 in FIGURES 1, 5, and 6, and prevent settling of heavier particles of the material. The air bubbles 93 from the diffuser 90 also provide air to the material within the tank 22 for the aerobic bacteria therein. Thus, sewage material is treated by aerobic bacteria within the compartment 86 and heavier parts of the material are not permitted to settle therein.

The partition 80 is provided with one or more openings 96 therethrough, which are located in the approximate elevational midportion of the partition 80, as shown in FIGURES 1 and 6.

Material from the compartment 86 which is of medium weight, i.e., the purest material in the compartment 86, may flow through the openings 96, as illustrated by arrows 98.

Carried by the side walls of the tank 22, in spaced relation from the partition 80, are a vertically disposed partition or baffle 100 and an inclined partition or baffle 102. The partitions or baffles 100 and 102 are spaced one from the other, with the baffle 102 being adjacent or in engagement with the floor or bottom wall 82 of the tank 22. The lower edge of the partition or baffle 102 is shown as being provided with an elongate notch 104 therein, as shown in FIGURE 6, for a reason discussed below. Preferably, the upper edge of the partition 102 is positioned somewhat beyond the lower edge of the partition 100 and intermediate the partitions 80 and 100. Thus, the partitions 80, 100, and 102, with the side walls of the tank 22, form a compartment 105 within the tank 22.

Within the compartment 105 and carried by the bottom wall 82 is a base 106. The base 106 is below the inclined partition or baffle 102 and extends transversely across the tank 22 between opposed side walls thereof. The base 106 is, preferably, made of plastic material or other material which is not injuriously affected by the material within the tank 22. The base 106 has an upstanding portion 107 which extends to a position adjacent the inclined baffle 102. The upstanding portion 107 serves as a baffle spaced from the baffle 102 so that a proper passage is formed therebetween for providing a draft or material lift effect.

Figure 7:
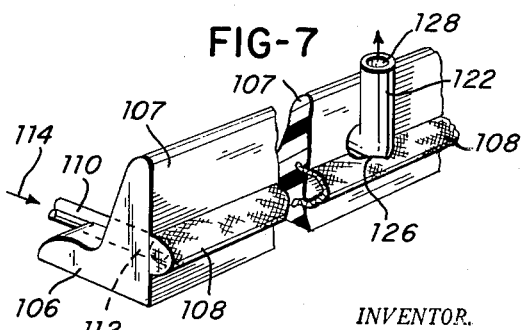
FIGURE 7 is an enlarged fragmentary perspective view, of a portion of the structure shown in FIGURES 1, 4, and 6.

Screen or perforated tube 108 is carried by the base 106 along the length thereof and is, preferably, molded integral therewith, as shown in FIGURE 7. An inlet tube 110 is joined to the base 106 and is in communication with a passage 112 which leads into the tube 108, as shown in FIGURE 7. The inlet tube 110 extends to any suitable position outside the tank 22 and has air or other gas forced thereinto, as illustrated by an arrow 114 in FIGURE 1.

As shown in FIGURE 4, the diffuser 90 may be connected to the base 106 by a conduit 115 to receive a portion of the air conducted to the base through the tube 110.

Thus, air is forced through the tube 110 and into the screen or tube 108. The air flows from the tube 108 and moves upwardly as bubbles 116 below the inclined partition or baffle 102, as shown in FIGURE 1. This upward movement of air causes a draft which draws material through the notch 104 which forms a passage between the bottom wall 82 and the inclined baffle 102.

Preferably, the screen or tube 108 is made of a collapsible plastic material or other material which is not injuriously affected by the sewage material within the tank 22. Also, the tube 108 is preferably collapsible so that it collapses under the weight or pressure of the sewage material within the compartment 105 when air is not being forced into the tube 108. Thus, the tube 108 may be self sealing to substantially prevent sewage material within the compartment 104 from moving into the tube 108.

Figure 8:
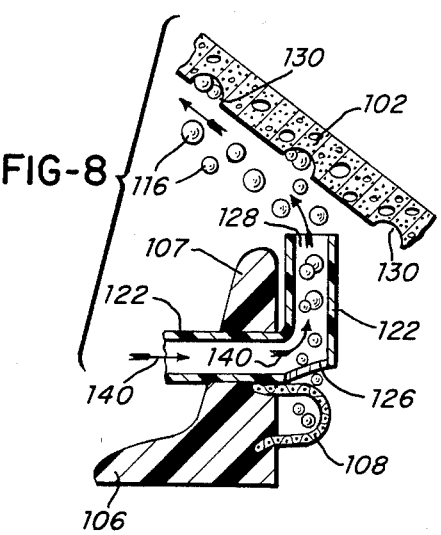
FIGURE 8 is a sectional view, on a larger scale, of a portion of the structure shown in FIGURES 1, 4, and 6.

The vertical partition or baffle 100 has an aperture 120 therethrough, as shown in FIGURES 1 and 6, within which the upper end of a scum tube or conduit 122 is disposed. The scum tube 122 extends downwardly to a position under the inclined baffle or partition 102 and has a lower end thereof passing through the base 106 and upwardly therefrom, as shown in FIGURE 8. The tube 122 has an intermediate opening 126 directly above the screen 108 and has an outlet opening 128 adjacent the lower edge of the inclined baffle 102, as shown in FIGURE 8. Thus, some of the air emanating from the screen or tube 108 moves upwardly through the opening 126 and into the scum tube 122 and then moves outwardly therefrom through the opening 128, as shown in FIGURE 8, for a purpose discussed below. Thus, all of the air bubbles 116 issued from the screen or tube 108 pass upwardly along the lower surface of the inclined baffle or partition 102. The lower surface of the partition 102 is irregular and non-planar, having higher and lower parts forming a plurality of entrapment portions 130 which cause partial entrapment of some of the air bubbles 116. The recesses 130 also provide space for growth of aerobic bacteria.

The partially treated sewage material entering the compartment 105, as shown by arrows 98 receives additional aerobic bacteria treatment. The air bubbles 16 provide oxygen and agitation to the sewage material. The air moving upwardly along the under surface of the partition or baffle 102 causes a draft through the passage formed by the notch 104. This draft, in part, results in movement of the sewage material in a manner illustrated by arrows 132. Some of the material within the compartment 105 flows therefrom through the passage provided by the space between the baffles 100 and 102.

Also, as a result of this draft effect heavier material which passes between the partitions 100 and 102, as shown by arrows 134 in FIGURES 1 and 6, moves downwardly above the upper surface of the inclined baffle 102. The material is then drawn through the notch 104 of the baffle 102 to positions under the baffle 102.

Due to the fact that the tank 22 is polygonal in shape, the width dimension decreases toward the end thereof, as best shown in FIGURES 4 and 6. Thus, the inclined baffle or partition 102 engages the sides of the tank 22 at various portions thereof so that a hopper bottom is formed so that all of the material moving downwardly above the slanting baffle 102 is directed through the passage formed by the notch 104. No additional side portions are needed between the sides of the tank 22 and the inclined baffle 102 to form the hopper bottom adjacent the passage formed by the notch 104 through which material moves. This hopper bottom structure is therefore possible in a container structure in which there is a decreasing dimension between opposed walls, such as in an elliptical or a tapered container as well as in a polygon container. Thus, this heavier is caused to move so that increased treatment thereupon by the bacteria and other action is possible.

The lightest material passing between the partitions 100 and 102 moves upwardly and may form a scum 138, as shown in FIGURE 1. A small portion of the scum 138 is drawn into the opening 120 of the partition 100 and moves into the scum tube 122, as illustrated by arrows 140 in FIGURES 1, 6, and 8. The scum 138, as shown by arrows 140, is moved downwardy by the draft action of the air which moves into the opening 126 and out of the opening 128 at the end of the tube 122, as shown in FIGURE 8. Thus, the scum 138 is moved downwardly within the tube 122 and is forced out of the opening 128 of the tube 122 so that the scum 138 is moved and circulated and treated by the air emanating from the tube or screen 108.

An outlet baffle 144 is disposed adjacent an outlet 146 of the tank 22 so that the scum 138, as shown in FIGURE 1, is prevented from movement through the outlet 146. The purest material in the tank 22 flows therefrom through the outlet 146, as illustrated by an arrow 150 in FIGURES 1 and 6.

STRUCTURE OF FIGURE 9

FIGURE 9 shows structure of this invention in which sewage receives anaerobic and aerobic treatment within a singe tank 160 and in which most of the sewage which is treated by aerobic bacteria is not treated by anaerobic bacteria.

Sewage enters the tank 160 through an inlet 162 in a side portion 163, as illustrated by an arrow 164. An elongate vertically extending baffle 166 directs all of the incoming material downwardly. An inclined deflector 168 is disposed below the baffle 166 and is shown in engagement with the bottom of the tank 160. The deflector 168 is also shown in engagement with partition members 170 and 172 and disposed intermediate thereof. The partitions 170 and 172 are shown as being substantially vertical and are spaced one from the other and are spaced from the end of the tank 160 so that compartments 174 and 175 are formed.

A partition 176 which is above the deflector 168 forms a sub-compartment 177 in the compartment 175, as discussed above with respect to the partition 47.

Sludge forms at the bottom of the compartment 175, in a manner discussed above with respect to the compartment 44. The purest material of the compartment 175 flows through an opening 178 into the compartment 174. Due to the fact that no appreciable air is supplied to the compartments 174 and 175, anaerobic bacteria action occurs therein. The purest material of the compartment 174 flows into the sub-compartment 177 through an opening 180 in the partition 170, as illustrated by an arrow 181. A slot or opening 182 in the partition 170, at the upper edge thereof and adjacent the baffle 166, permits movement of scum between the sub-compartment 177 and the compartment 174, as illustrated by an arrow 179.

The purest material of that entering the tank 160 through the inlet 162 flows directly under a baffle 183 and then through an opening 184 in the partition 172, as illustrated by an arrow 186. Also, flowing through the opening 184 is the material which flows into the sub-compartment 177 through the opening 180, as illustrated by the arrow 181.

Thus, material, illustrated by an arrow 185 flows through the opening 184 into an aeration compartment 187 which, in part, is formed by a partition 188, as well as by the partition 172. A diffuser 189 within the compartment 187 provides oxygen and turbulence to the material therein. Material within the compartment 187 may move in a manner illustrated by arrows 191. Thus, aerobic bacteria action occurs within the compartment 187 and heavier materials therein are not permitted to settle to the bottom of the tank 160.

Material from the compartment 187 flows through one or more openings 190 through the partition 188 into a second aeration compartment 192 which, in part, is formed by a partition or baffle 194 and by a slanting baffle 196, as well as by the partition 188. The slanting baffle 196 has a notch 198 therein so that a passage is formed between the baffle 196 and the floor or bottom of the tank 160. Some of the material within the compartment 192 flows therefrom between the baffles 194 and 196, as illustrated by arrows 199.

An inlet conduit 200 carries air to the diffuser 189 through a line 202, which passes through the partition 188, and to a diffuser 204. The diffuser 204 serves to cause movement of material in a manner such as illustrated by arrows 203 and 205.

A scum conduit 206 passes through the partition 194 and has a lower end carried by the diffuser 204 in a manner discussed above with respect to the scum conduit 122 and the perforated tube 108. Thus, a small trickle of scum, as illustrated by arrows 207, is caused to move from the top portion of the tank 160 to the lower portion thereof, through the conduit 206, for treatment by air and aerobic bacteria. The purest material of the tank 160 flows under a baffle 210 and from the tank 160 through an outlet 212. Thus, both anaerobic bacterial action and aerobic bacterial action occur within the tank 160 and much of the material which is treated by aerobic bacteria is not treated by anaerobic bacteria.

STRUCTURE OF FIGURES 10 AND 11

FIGURES 10 and 11 show a structure of this invention which includes a substantially rectangular tank 220. Sewage material enters the tank 220 through an inlet 222 and is directed downwardly by a baffle 224. Material is treated by anaerobic bacteria within compartments 226 and 228 which are formed, in part, by partitions 230 and 232. Material may flow from the compartment 228 into the compartment 226 through an opening 233, which is similar to the opening 178 shown in FIGURE 9. A deflector 234 and a baffle 236 are within the compartment 228. Sewage material is treated within the compartments 226 and 228 and moves within the compartments 226 and 228 in a manner discussed above with respect to the tanks 20 and 160. The purest sewage material in the compartments 226 and 228 flows under a baffle 238 and through an opening 240 through the partition 232.

Within the remainder of the tank 220 aerobic bacteria action occurs. A diffuser 242 has air or gas provided thereto through a conduit 244. A slanting baffle 246 is above the diffuser 242 and a vertical baffle 248 is above the baffle 246 and is spaced therefrom. The slanting baffle 246 is provided with a notch 250 for passage of material between the baffle 246 and the bottom of the tank 220.

Material flows from the tank 220 through an outlet 254.

SUMMARY

Thus, it is understood that sewage treatment structure of this invention provides means by which anaerobic bacteria action and/or aerobic bacteria action in the treatment of sewage occurs. The structure of this invention as shown in any of the figures may be used with any other sewage treatment structure in a sewage treatment process.

Due to the fact that the outlet and inlet openings of an anerobic chamber or compartment are spaced rather closely together, as shown in FIGURES 1, 2, 3, 9, and 10, gases which may flow in a reverse direction through these openings pass over a very small part of the material which is anaerobically treated. Thus, the moving gases do not gather much of the noxious materials which may exist above the material which is anaerobically treated.

Material which is anaerobically treated and which flows from the anaerobic sections of the structure is doubly treated and remains in the anaerobic bacteria section of the structure a longer time than in conventional structures. The material which is treated by anaerobic bacteria remains in the structure a longer period of time due to the fact that a part of all the material which flows into such section flows directly therefrom without obtaining treatment thereupon. Thus, such material which is treated by anaerobic bacteria is more completely treated by such bacteria in structure of this invention.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. Structure for aerobic bacteria treatment of sewage comprising a container provided with an inlet passage and an outlet passage, a partition member, the partition member separating the container into two compartments, there being a first compartment and a second compartment, the inlet passage being in communication with the first compartment and the outlet passage being in communication with the second compartment, a gas diffuser at the bottom of the first compartment from which gas is forced outwardly, a first baffle and a second baffle within the second compartment, the first baffle being substantially vertical, the second baffle being angularly inclined and disposed below the first baffle and spaced therefrom, there being a passage between the second baffle and the bottom of the second compartment, the partition member having an opening therethrough for movement of material from one compartment to the other compartment, a gas diffuser below the second baffle, and a scum conduit extending from an upper portion of the second compartment to the gas diffuser which is below the second baffle.

2. Sewage treatment structure for anaerobic and aerobic bacteria treatment of sewage comprising container means provided with an anaerobic bacteria section having an inlet passage and an outlet passage, the inlet and outlet passages being in adjacent relationship, baffle means partially separating the inlet and outlet passages one from the other and from the remainder of the section, a partition dividing the anaerobic bacteria section into a first compartment and a second compartment, the baffle means being within the first compartment, the partition having a plurality of openings therethrough for movement of material from one compartment to the other compartment, the container means also being provided with an aerobic bacteria section, there being communication between the outlet passage of the anaerobic bacteria section and the aerobic bacteria section for movement of material from the anaerobic bacteria section to the aerobic bacteria section, a vertical baffle and an inclined baffle within the aerobic bacteria section, the vertical baffle being above the inclined baffle and spaced therefrom, aeration means below the inclined baffle.

3. In sewage treatment structure, an inclined baffle member, a vertical baffle member disposed above the upper portion of the inclined baffle member, the inclined baffle member having a lower surface, a scum conduit extending from a position adjacent the vertical baffle member to a position below the lower surface of the inclined baffle member, the scum conduit having an opening at the upper portion thereof, the scum conduit having an upwardly extending lower portion adjacent the lower surface of the inclined baffle member, the upwardly extending lower portion of the scum conduit having a bottom opening and a top opening, and gas diffuser means disposed below the bottom opening of the upwardly extending portion.

4. Sewage treatment structure comprising:
   a container having opposed side walls and a bottom wall, the container being provided with an inlet passage and an outlet passage, the passages being in adjacent relationship,
   a substantially vertical partition within the container, the partition engaging the side walls and the bottom wall and dividing the container into two compartments, the partition being provided with a plurality of openings therethrough spaced from the bottom wall of the container, one of the openings being adjacent the inlet passage,
   a substantially vertical baffle, the baffle engaging the partition and one of the side walls, the baffle being spaced from the bottom wall and defining a sub-compartment within one of the compartments, the inlet and outlet passages being within the sub-compartment,
   a comparatively short vertical baffle within the sub-compartment and adjacent the outlet passage.

5. Sewage treatment structure comprising:
   a container having a bottom wall,
   a partition within the container and engaging the bottom wall and dividing the container into a first compartment and a second compartment, the partition having an opening therethrough,
   the container having an inlet passage and an outlet passage within the first compartment, the inlet passage and the outlet passage being disposed in adjacent relationship so that a portion of the sewage entering the container through the inlet passage can flow directly outwardly from the container through the outlet passage,
   baffle means within the first compartment and spaced from the bottom wall and forming a sub-compartment which separates the inlet passage and the outlet passage from the remainder of the first compartment so that the inlet passage and the outlet passage are in the sub-compartment,
   there being an opening through the partition from the second compartment to said sub-compartment of the first compartment, said opening being adjacent the inlet passage,
   and an inclined deflector disposed below said baffle means and below the inlet passage.

6. Sewage treatment structure comprising:
   a container provided with an enclosing wall and a bottom wall, there being an inlet passage and an outlet passage in the enclosing wall,
a partition within the container engaging said enclosing wall and engaging said bottom wall, the partition separating the container into two compartments, the inlet and outlet passages being in the same compartment, the partition having an inlet opening and an outlet opening,
baffle means adjacent the inlet passage and spaced from the bottom wall,
baffle means adjacent the outlet passage and spaced from the bottom wall,
an inclined deflector disposed below said inlet and outlet passages and said baffle means and having a lower edge in engagement with the bottom wall, an upper edge of the inclined deflector engaging said enclosing wall,
and a vertically disposed baffle member spaced from the bottom wall adjacent said enclosing wall and adjacent said baffle means and forming a sub-compartment within which at least part of said baffle means are disposed, the vertically disposed baffle member engaging the partition so that the outlet opening thereof communicates directly with said sub-compartment, the vertically disposed baffle member being above the inclined deflector and spaced therefrom, an intermediate portion of the inclined deflector being below the vertically disposed baffle member so that sewage material cannot lodge in the space below the sub-compartment, 7. Sewage treatment structure comprising:
a container provided with a substantially horizontal bottom wall and a substantially vertical enclosing wall, there being an inlet passage and an outlet passage in the enclosing wall, the passages being in adjacent relatioinship,
a partition member engaging opposed portions of said enclosing wall, the partition also engaging the horizontal bottom wall and dividing the container into two compartments, the inlet passage and the outlet passage being in the same compartment so that a portion of the sewage material entering through the inlet passage moves directly from the container through the outlet passage,
an inclined deflector having an upper edge engaging the enclosing wall below said passages and a bottom edge engaging the bottom wall,
a vertically disposed baffle member engaging said enclosing wall and the partition member and spaced from the bottom wall and forming an open chamber portion within which the passages are disposed, the baffle member being above an intermediate portion of the inclined deflector so that sewage material cannot become lodged below the open chamber portion, the baffle member being spaced from the inclined deflector, the inlet passage and the outlet passage and the baffle means and the baffle member being within the same compartment,
the partition member having a passage in communication with said chamber and adjacent the inlet passage, the partition member also having a passage therethrough which communicates with both of said compartments, the last said passage being spaced from the inlet passage and from the outlet passage.

8. Sewage treatment structure comprising:
a container having opposed side walls and a bottom wall and provided with a partition which engages the opposed side walls and the bottom wall and divides the container into two compartments,
one of the compartments being a first compartment and having an inlet passage, the other compartment being a second compartment and having an outlet passage, the partition having an opening therethrough for communication between the compartments,
aeration means within the second compartment and adjacent the bottom portion thereof,
a vertical baffle within the second compartment and spaced from the partition and spaced from the outlet passage,
an inclined baffle within the second compartment and spaced from the partition and below the vertical baffle, the vertical baffle being adjacent the upper portion of the inclined baffle but spaced therefrom,
the inclined baffle being inclined downwardly in a direction from the vertical baffle and inclined downwardly in a direction from the partition, the inclined baffle having a lower edge adjacent the bottom wall below the outlet passage.

9. Structure for aerobic bacteria treatment of sewage material comprising:
first container means,
second container means,
the first container means and the second container means being in communication one with the other for flow of fluid therebetween,
the first container means having an inlet passage, the second container means having an outlet passage, each container means having a bottom portion,
a first baffle and a second baffle within one of the container means, the first baffle being substantially vertical, and the second baffle being angularly inclined and disposed below the first baffle and spaced therefrom, there being a passage between the second baffle and the bottom portion of the container means within which the first baffle and the second baffle are disposed,
and means for causing movement of sewage material through the space between the first baffle and the second baffle and through the passage between the second baffle and the bottom portion of the container means within which the first baffle and the second baffle are disposed, said means being positioned within the container means within which the first baffle and the second baffle are disposed.

References Cited by the Examiner

UNITED STATES PATENTS

| 1,223,004 | 4/17 | Starr | 210—16 |
| 1,936,305 | 11/33 | Leffler | 261—123 |
| 2,118,266 | 5/38 | Nordell | 210—6 |
| 2,597,802 | 5/52 | Kappe | 210—4 X |
| 2,852,140 | 9/58 | MacLaren | 210—221 |
| 2,889,929 | 6/59 | Kivell | 210—221 X |
| 2,978,234 | 4/61 | Lamb | 261—122 |
| 3,028,011 | 4/62 | McGivern | 210—220 |
| 3,053,390 | 9/62 | Wood | 210—221 X |

FOREIGN PATENTS

| 738,240 | 8/43 | Germany. |
| 807,639 | 1/59 | Great Britain. |

OTHER REFERENCES

Venable: Methods and Devices For Bacterial Treatment of Sewage, first edition, 1908, John Wiley and Sons, N.Y., pp. 58–70 relied on.

Fuller: Sewage Disposal, first edition, 1912, McGraw-Hill, New York, N.Y., pp. 466–474, 482, 487, and 490–493 relied on.

MORRIS O. WOLK, *Primary Examiner*.

EARL M. BERGERT, *Examiner*.